Patented Apr. 7, 1953

2,634,261

UNITED STATES PATENT OFFICE 2,634,261

UREA COMPLEXES

Lloyd C. Fetterly, Seattle, Wash., assignor to Shell Development Company, San Francisco, Calif., a corporation of Delaware No Drawing. Application January 9, 1948, Serial No. 1,478

12 Claims. (Cl. 260—96.5)

This invention is concerned with novel crystalline complexes. More particularly, it is directed to novel complexes formed between urea and certain nitrogenous organic compounds.

The formation of crystalline complexes which are readily decomposable has received recent attention, particularly in regard to the formation of crystalline complexes between urea and substantially unbranched hydrocarbons. A minor amount of work has been reported on the formation of such complexes between urea and straight-chain oxygen-containing compounds such as fatty acids. A single case has been observed wherein a complex was formed between 2,6-lutidine and urea and use was made of this phenomenon for the separation of 2,6-lutidine from its mixtures with the picolines, the latter said to be inert toward urea.

The exact constitution of these crystalline complexes has not been determined, especially in regard to the exact configuration of the complex which forms between the two components thereof. It has been ascertained that such complexes usually contain approximately one mol of urea for each carbon atom of the material bound thereby in complex form but the exact configuration cannot be deduced from this meager amount of information. As more fully described hereinafter, it is known that the complexes may be readily decomposed by the influence of heat and other means and that the products of such decomposition are the original organic materials and urea.

In the absence of any theoretical postulations regarding the types of organic materials which should be capable of forming complexes with urea, the reaction must be investigated on strictly empirical grounds. Until a greater number of types of organic materials have been studied in regard to their complex-forming ability, little prediction may be made in this regard. However, it has been ascertained that the ability to form crystalline complexes with urea appears to depend upon structural configuration and chemical constitution. For example, it has been found that substantially unbranched hydrocarbons will form complexes with urea while highly branched hydrocarbons and naphthenes do not appear to form such complexes. Hence, once the type has been established by the formation of representative species of a group, prediction of complex formation within that group appears to be logical.

It is an object of this invention to provide novel complexes of urea with certain nitrogenous organic compounds. It is another object of this invention to provide a method for the fractionation of mixtures containing certain nitrogenous organic compounds. Other objects will become apparent during the following discussion.

Now, in accordance with this invention, it has been found that urea forms crystalline complexes with nitrogenous organic compounds having at least one hydrocarbyl group directly attached to a nitrogen atom. Again in accordance with this invention, the most readily formed complexes of this class are those of urea with secondary amines. Still in accordance with this invention, it has been found that this discovery may be utilized for the fractionation of mixtures containing such nitrogenous materials. Finally, this process may be utilized for the isolation and purification of these particular substances.

The term "hydrocarbyl" is understood to include the radical obtained by the loss of one hydrogen atom from any hydrocarbon (see footnote page 26 in "An Outline of Organic Nitrogen Compounds" by Edward F. Degering, 1942 edition). Briefly, the process comprises contacting urea with at least one of the nitrogenous substances defined above. Crystalline complexes are formed and may be utilized or decomposed all as more fully discussed hereinafter.

The nitrogenous compounds forming complexes with urea most readily are the amines. The influence of the amino group upon the complex-forming tendencies is readily apparent from the fact that amines having branched alkyl groups form crystalline complexes with urea as readily as those having substantially unbranched structure. This is in sharp contrast to the complex-forming characteristics of the corresponding hydrocarbons. In the latter case only the straight chain hydrocarbons form complexes with urea, while the branched hydrocarbons are not affected.

The secondary amines are a special class forming urea complexes with particular ease at room temperatures. Typical members of this class include dialkylamines wherein the two unbranched alkyl radicals attached to the nitrogen atoms are the same, such as dimethylamine, diethylamine, di-n-propylamine, di-n-butylamine, di-n-amylamine, di-n-hexylamine, di-n-heptylamine, di-n-octylamine, di-n-nonylamine, di-n-decylamine, di-n-dodecylamine, di-n-octadecylamine, etc.

Another class of secondary amines suitable for the present purpose includes the symmetrical isoalkylamines such as di-isopropylamine, di-sec-butylamine, di-tert-butylamine, di-n-amylamine, di-sec-amylamine, di-tert-amylamine, as well as their higher analogs, homologs and derivatives.

Primary and tertiary alkyl and aryl amines also are outstanding in their ability to form crystalline complexes with urea. Suitable primary alkylamines for this purpose are ethylamine, propylamine, butylamine, amylamine, hexylamine, heptylamine, and the higher amines having one unbranched alkyl substituent; isopropyl amine, sec-butylamine, tert-butylamine, isoamylamine and the higher amines having one branched alkyl substituent.

Tertiary amines which form crystalline complexes with urea may be either simple or mixed amines such as triethylamine, tributylamine, methyldiisobutylamine as well as their higher homologs, analogs and substitution products.

While the amines form crystalline complexes with urea with the greatest ease, other nitrogen containing compounds bearing hydrocarbyl groups may be used as well. An important class comprises the nitroalkanes, of which typical suitable species for complex formation are 1-nitropropane, 1,2-dimethyl-3-nitropropane, 1-nitro-3-tert-butylbutane, 2-nitro-3-methylbutane, 3-nitro-3-isopropylpentane, 1-nitro-1,1-dimethylbutane, etc. Nitroalkenes also form complexes with urea. Suitable species for this purpose are 2-methyl-3-nitropropene, 4-nitro-1-butene, nitroethylenes, etc.

Other nitro compounds which are utilized in the formation of urea complexes are the polynitro derivatives, and the halonitro compounds. Typical members of these groups are dinitromethane, 1-chloro-1-nitroethane, 1-nitro-2-butanol, etc. Azo compounds which are suitable for the formation of urea complexes include diazomethane, diazoethane, azidomethane, diazidoethane, etc.

The process by which these complexes are formed may be conveniently separated into three stages, namely, contacting, phase separation and regeneration. The contacting step is subject to a number of possible variations, including the medium in which contacting is carried out. Urea may be dissolved in a number of different solvents such as water, alcohol, sulfur dioxide or acetic anhydride, and mixtures thereof, the only limitation being that the urea solvent should be substantially inert toward urea itself. Aqueous solvents are preferred for many substances but solvents of the character of sulfur dioxide have the advantage of increasing the rate of reaction especially when contaminating aromatic hydrocarbons are present.

The nitrogenous compounds may be contacted with urea in their pure state or mixtures containing them may be used. Furthermore, the nitrogenous substances may be modified by the presence of a diluent or solvent such as an isoparaffin, naphthene or other material which does not form complexes with urea under the conditions employed. Suitable solvents for this purpose include iso-octane, methyl isobutyl ketone and methyl ethyl ketone. Each of these modifiers has a particular effect upon the course of the complex-forming action. It has been found, for example, that the use of methyl ethyl ketone permits complex formation to occur at temperatures substantially higher than when other diluents are present. The use of methyl isobutyl ketone accelerates the rate of complex formation and favors optimum crystalline formation.

The conditions discussed above are those which are to be used when a liquid environment is desired. However, the complex formation may be conducted under other conditions whereby gaseous nitrogenous materials are contacted with urea, the latter being in a finely divided solid state or in a dissolved condition. This set of conditions is particularly desirable when relatively volatile materials are to be handled. The feed mixture may be modified by the presence of substantially inert gases such as nitrogen. This is particularly desirable since the nitrogen will protect the system from contamination with atmospheric oxygen. The exclusion of oxygen has been found to be highly desirable since the reactants present promote excessive corrosion of metallic apparatus in the presence of air.

Contacting is usually carried out by means of agitation or turbulence and preferably is conducted continuously. Some of the nitrogenous materials form crystalline complexes with urea almost immediately upon contact while others appear to require a substantially longer period before crystallization commences. One means of shortening this period (which may be called the "induction period") is to employ urea which has been heated in the presence of water or which has been used previously in complex formation and which has been regenerated from the complexes so formed. The exact effect of such heating or use upon the activity of the urea has not been determined but it has been found that the rate of complex formation may be greatly increased by using urea which has been treated in one of these two ways.

The contacting of urea with the nitrogenous materials may be carried out at temperatures usually varying from −10 to about 70° C. It has been found that each reactive species of organic substances capable of complex formation with urea has a particular temperature range within which complexes can be formed and above which the rate of decomposition of the complex exceeds that of its formation. This maximum temperature of complex formation varies substantially from one individual material to another. Therefore this phenomenon may be utilized for the further fractionation of mixtures of organic materials which contain more than one substance capable of forming complexes with urea. By contacting urea with such a mixture at a temperature whereat only one of its components is capable of complex formation separation of the mixture into two fractions is readily effected. After the complexes so formed have been separated from the reaction mixture the temperature of the reaction may be decreased and further contact with urea carried out so as to allow further complex formations.

One of the problems which must be met in carrying out the process of the present invention is the separation of the complexes formed from the other components of the reaction mixture. It has been found that the crystalline complexes are preferentially wet by oily substances and that they therefore tend to remain in any oil phase which is present rather than separate readily therefrom. This problem is particularly acute when the complex formation is being utilized for the fractionation of oily mixtures of compounds containing the subject nitrogenous materials. Various means may be taken to cause phase separation so as to permit the recovery of a highly purified crystalline product. The use of solvents such as secondary butyl alcohol appears to promote clean phase separation and to encourage the crystalline complex to settle into a non-oily phase. Other means of causing sharp phase separation and removal of the complex from an oily phase includes the use of certain inorganic and organic surface active agents.

The separation of these complexes may be accelerated by the use of low reaction temperatures. The use of such temperatures not only permits crystallization but also permits the formation of complexes between urea and nitrogenous substances which are normally inactive at higher temperatures.

The concentration of urea in its solvent is an important factor in determining the course of the complex-forming action. The use of substantially saturated solutions promotes maximum complex formation. Hence, as the urea solution becomes depleted due to complex formation the reaction tends to be retarded. One means of overcoming this difficulty comprises gradually lowering the temperature so as to maintain a substantially saturated solution at all times. It has been discovered that each complex-forming substance can only form complexes with urea within definitely limited ranges of urea concentration. If the urea solution becomes too dilute complex formation with that particular substance ceases. This phenomenon may be utilized in the separation of mixtures of complex-forming compounds. A partially saturated solution of urea may be contacted with a mixture under such conditions of temperature that only certain fractions of the mixture will form complexes with urea. Hence, the maintenance of control over temperature and urea concentration is important.

When crystalline complexes have been formed they may be separated from the rest of the reaction mixture by such well-known operations as centrifuging and filtration. The crystalline materials, as referred to hereinabove, are well defined substances which are readily decomposable, usually below their melting points. They are insoluble in most of the common organic solvents. The complexes usually contain about one mol of urea for each carbon atom of the nitrogenous substance and some of them also contain solvent of crystallization. They may be used for such purposes as pharmaceutical components, fertilizers or insecticides or may be decomposed to recover the nitrogenous material and urea.

The decomposition of the complexes is readily effected by heating them in the presence of a solvent for urea, such as water. If the nitrogenous material is insoluble in water the heated mixture separates into two phases, one being the regenerated nitrogenous substance and the other being an aqueous urea solution. Decomposition may be effected also by heating in the presence of a solvent for the nitrogenous material either by the use of dry heat or steam distillation.

The following example illustrates the present invention:

*Example*

An aqueous solution of urea saturated at 25° C. was agitated with di-n-butylamine at 25° C. A crystalline complex was formed which could be decomposed by the use of dry heat to recover the original amine and urea. Similar complexes were formed by the same process between urea and methyl-n-amylamine, diisopropylamine, 1,3-dimethylbutylamine, dipropylamine and 1-nitropropane.

Urea complexes with certain nitrogen containing organic compounds, viz., amines such as n-decyl amine, dibutyl amine and triethyl amine; amides, such as stearamide; alkyl hydrazines, amino acids and nitroparaffins, are disclosed, but not claimed, in my prior application Serial No. 738,213, filed March 29, 1947, now Patent No. 2,520,715; and also in my prior application Serial No. 782,449, filed October 27, 1947, now Patent No. 2,569,984, said prior patent applications being the parent applications of which the present case is a continuation-in-part.

I claim as my invention:

1. As a new composition of matter, a crystalline complex of urea with a secondary dialkylamine.
2. As a new composition of matter, a crystalline complex of urea with a primary alkylamine.
3. As a new composition of matter, a crystalline complex of urea with a nitroalkane.
4. As a new composition of matter, a crystalline complex of urea with a nitroalkene.
5. As a new composition of matter, a crystalline complex of urea with di-n-butylamine.
6. As a new composition of matter, a crystalline complex of urea with 1-nitropropane.
7. As a new composition of matter, a crystalline complex of urea with 4-nitro-1-butene.
8. As a new composition of matter, a crystalline complex of urea with an aliphatic compound of the group consisting of primary alkylamines, secondary dialkylamines, mononitroalkenes and mononitroalkanes.
9. The process for the formation of crystalline complexes which comprises contacting a saturated aqueous solution of urea with a nitroalkane at a temperature between −10° C. and +70° C.
10. A solid complex of urea with a long chain alkyl primary amine.
11. A process which comprises contacting an aqueous solution of urea at about room temperature with a mixture containing a long chain alkyl primary amine and separating the urea-long chain alkyl primary amine complex thus formed.
12. A complex of urea with di-(n-dodecyl) amine.

LLOYD C. FETTERLY.

REFERENCES CITED

The following references are of record in the file of this patent:

UNITED STATES PATENTS

| Number | Name | Date |
| --- | --- | --- |
| 1,051,926 | Stockelbach | Feb. 4, 1913 |
| 1,951,518 | Meiser | Mar. 20, 1934 |
| 2,131,127 | Ter Horst | Sept. 27, 1938 |
| 2,253,528 | Allin | Aug. 26, 1941 |
| 2,376,008 | Riethof | May 15, 1945 |
| 2,520,715 | Fetterly | Aug. 29, 1950 |

OTHER REFERENCES

Baum, "Ber. deut. Chem.," col. 41, p. 528 (1908).
Atkins et al., "J. Chem. Soc." (London), vol. 101 (1912), pp. 1988 to 1991.
Reynolds, "J. Chem. Soc." (London), vol. 59 (1891), Trans. pp. 387–392.
Taylor, "J. Chem. Soc." (London), vol. 111 (1917), pp. 657–660.
Singh et al., "J. Chem. Soc." (London), vol. 119 (1921), pp. 210–211.

(Other references on following page)

OTHER REFERENCES

Howells, "J. Chem. Soc." (London), 1929, p. 911.
Matignon, "Bull. Soc. Chim." (Paris), series 3, vol. 11 (1894), p. 575.
Nijveld, "Rec. Trav. Chim. Pays Bas," vol. 53 (1934), pp. 430–431.
Perktold, "Monatschefte fur Chemie.", vol. 56 (1930), p. 248.
Whaley et al., "Jour. Am. Chem. Soc.," vol. 68 (May 1946), pp. 793–794.
Muller, "Zeit. Physiol. Chem.," vol. 268 (1941), p. 245.
Roberts et al., "Chemical Abstracts," vol. 33 (1939), p. 6449.
De Souza, "Chemical Abstracts," vol. 38 (1944), p. 5043.
USSR 65779, "Chemical Abstracts," vol. 40 (1946), p. 7234.
Hryakowski et al., "Chemical Abstracts" vol. 28 (1934), p. 7.
Vanino et al., "Chemical Abstracts," vol. 23 (1929), p. 5185.
Wahl et al., "Chemical Abstracts," vol. 32 (1928), p. 7038.
Hodgson, "J. Chem. Soc., London, 1931, pp. 2227–2228.